United States Patent [19]

Galaj

[11] Patent Number: 4,487,689

[45] Date of Patent: Dec. 11, 1984

[54] SYSTEM FOR FILTERING A LIQUID

[75] Inventor: Stanislas Galaj, Arcueil, France

[73] Assignee: Compagnie Generale D'Electricite, Paris, France

[21] Appl. No.: 585,084

[22] Filed: Mar. 1, 1984

[30] Foreign Application Priority Data

Mar. 4, 1983 [FR] France ................ 83 03553

[51] Int. Cl.³ ................ B01D 13/00; B01D 31/00
[52] U.S. Cl. .................... 210/108; 210/137; 210/138; 210/143; 210/195.2; 210/257.2; 210/333.01; 210/433.2
[58] Field of Search ............. 210/106, 108, 134, 135, 210/137, 138, 139, 140, 143, 257.2, 195.2, 433.2, 321.1, 333.01, 333.1, 340, 341

[56] References Cited

U.S. PATENT DOCUMENTS 2,569,748 10/1961 De Grave .................. 210/167
3,398,088 8/1968 Okwy ...................... 210/433.2
3,992,301 11/1976 Shippey .................... 210/433.2

FOREIGN PATENT DOCUMENTS 2516536 3/1983 France ..................... 210/433.2

Primary Examiner—Ernest G. Therkorn
Attorney, Agent, or Firm—Sughrue, Mion, Zinn, MacPeak & Seas

[57] ABSTRACT

First and second identical filters (6, 20) are connected in series. A backpressure unit (30) for intermittent backwashing is connected to the outlet from the second filter. Means are provided for measuring or setting the pressure $P_1$ at the inlet to the first filter, the backpressure $P_2$, the pressure $P_3$ of the liquid between the two filters and the pressure $P_4$ at the outlet from the second filter. Means (34) determine $A = P_1 - 2P_3 + P_4$, and $B = (K/2N)(P_2 - 2P_1 + P_4)$, where K and N are constant coefficients, and a circuit (35) causes the backpressure unit to apply backpressure for backwashing when $A = B$. This amounts to comparing conditions in the first and second filters and triggering backwashing only when required, thereby avoiding wasting time with too frequent backwash operations, or conversely with dismantling and regenerating the filters due to too infrequent backwashing leading to clogging that cannot be cleaned by backwashing. The filter is particularly applicable to filtering organic liquids, such as milk, wine or beer.

8 Claims, 2 Drawing Figures

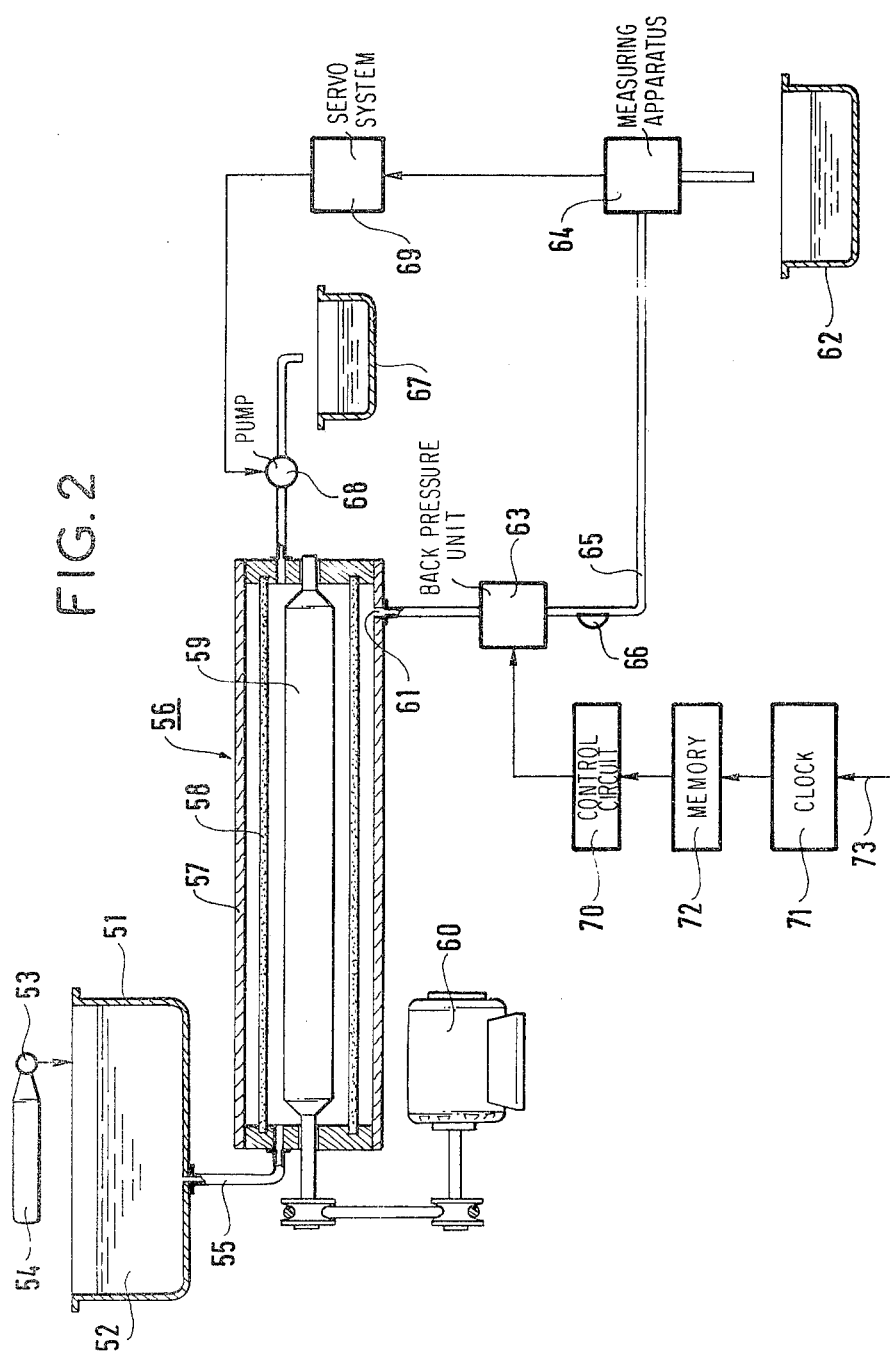

SYSTEM FOR FILTERING A LIQUID

The present invention relates to a system for filtering a liquid.

BACKGROUND OF THE INVENTION

A type of system known to the Applicant for filtering particles from a liquid comprises:

(a) a filter comprising: an enclosure
a filter chamber within said enclosure having an inlet and an outlet for said liquid, a portion of the wall of said chamber being constituted by a porous member of sintered material having an inside surface facing the inside volume of the chamber and an outside surface facing the other way, the inside and outside surfaces being parallel to each other, the porous member including a membrane one of whose surfaces constitutes said inside surface, the pores in the membrane being smaller than the particles to be filtered from said said liquid, each pore being in communication with adjacent pores, and said enclosure surrounding said outside surface, said enclosure being provided with an outlet opening;

(b) means for inserting the liquid into the chamber via its inlet and at a first constant pressure;

(c) means for impressing a predetermined speed parallel to the said inside surface to the liquid contained inside the chamber, a portion of the liquid passing through the porous member and being received in the enclosure;

(d) a pump connected to the outlet from the chamber and to a first tank for removing another portion of the liquid that has circulated inside the chamber;

(e) liquid flow rate measuring apparatus series connected between the opening of the outlet from the chamber and a second tank;

(f) a servo-control circuit receiving information concerning the measured flow rate and capable of controlling the pump to maintain a constant predetermined ratio between the measured flow rate and the pump flow rate; and (g) a controllable liquid backpressure unit connected between the opening of the enclosure outlet and the measuring apparatus for applying, during a predetermined period of time, a second constant liquid pressure on the outside surface of the porous member, in opposition to the first constant pressure.

In this system, the porous member may, for example, be constituted by a ceramic tube including a microporous tubular membrane, and the means for impressing a predetermined speed parallel to the inside surface of the tube may comprise a cylindrical core rotatably mounted inside the tube. The back pressure exerted by the liquid backpressure unit having the effect of backwashing the tube by removing from the membrane those particles which have become pressed against the said inside surface during filtering.

However, such a system has a drawback.

When the liquid backpressure unit is put into operation after a relatively long period of filtering, it may be that the membrane is no longer capable of being backwashed by the back pressure from said unit. It is then necessary to disassemble the porous member from the filter for regenerating the membrane, e.g. by pyrolysis in a high temperature oven or by chemical washing; in either case the filtering operation must be interrupted for some time. To remedy this drawback, an arbitrary and fairly high rate of backwashings may be instigated. However, each time the liquid backpressure unit is used, a certain quantity of filtered liquid is returned upstream from the filter, thereby increasing filter time and reducing overall system efficiency in terms of volume of liquid filtered per unit time.

Preferred embodiments of the present invention mitigate this drawback.

SUMMARY OF THE INVENTION

The present invention provides a filter of the above-defined type, wherein said filter is designated a first filter, said first constant pressure is a predetermined pressure $P_1$, and said second constant pressure is a predetermined pressure $P_2$ which is greater than $P_1$, the improvement wherein the system further includes:

(h) a second filter identical to the first filter, the inlet to the second filter being connected to the opening of the outlet from the enclosure of the first filter by a first pipe, the outlet from the second filter being closed, the opening of the outlet from the second filter enclosure being connected to the flow rate measuring apparatus via the backpressure unit;

(i) means for impressing said predetermined speed parallel to the inside surface of the porous member of the second chamber to the liquid contained therein;

(j) a manometer for measuring the pressure $P_3$ of the liquid flowing in said first pipe;

(k) means for maintaining the pressure $P_4$ of the liquid flowing in a second pipe constant when the backpressure unit is not operating, said second pipe connecting the outlet of the back pressure unit to the inlet of the flow rate measuring apparatus;

(l) a processor circuit receiving signals representative of the pressures $P_1$, $P_2$, $P_3$, and $P_4$, said circuit being capable of determining firstly the value:

$$A = P_1 - 2P_3 + P_4$$

and secondly the value:
$$B = (K/2N)(P_2 - 2P_1 + P_4),$$

where K is a predetermined safety factor less than unity, and N is a predetermined coefficient depending on the membranes of the porous members; and (m) a control circuit connected to the processor circuit and to the backpressure unit, said control circuit being capable of delivering a control signal when the values A and B as determined by the processor circuit are equal to each other, said control signal causing said backpressure unit to operate.

BRIEF DESCRIPTION OF THE DRAWINGS

Embodiments of the invention are described by way of example with reference to the accompanying drawings, in which:

FIG. 2 is a diagram of a filter unit which, when associated with the system shown in FIG. 1, constitutes a second embodiment of a system in accordance with the invention.

MORE DETAILED DESCRIPTION

Figure 1:
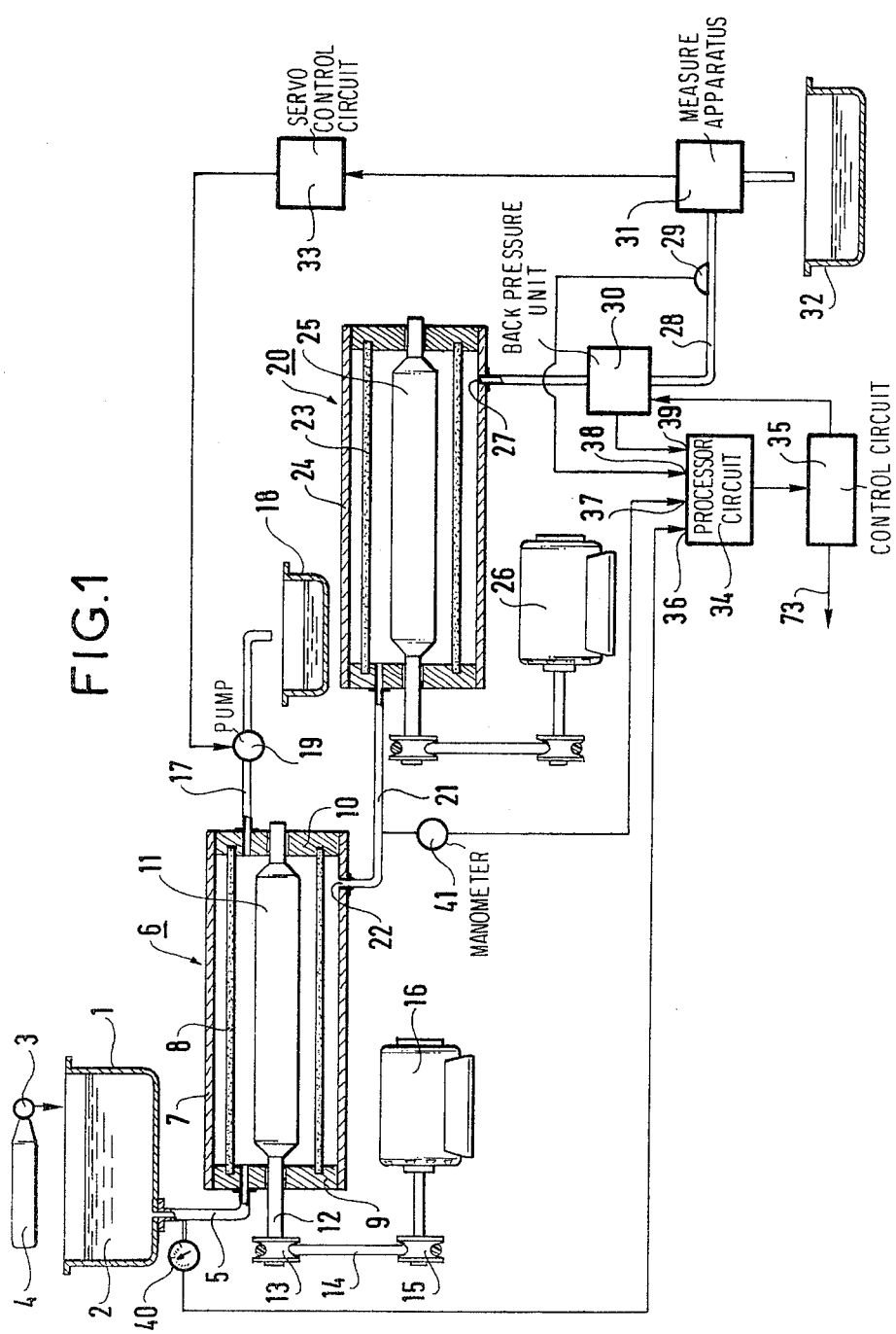
FIG. 1 is a diagram of a first embodiment of a filter system in accordance with the invention.

FIG. 1 shows a tank 1 containing a liquid 2 which includes particles in suspension to be filtered. The volume in the tank 1 above the liquid equilibrium surface is in communication with an escape valve 3 at the outlet from a cylinder 4 of compressed gas. A pipe 5 connects the bottom of the tank 1 to the inside volume of a filter 6. The filter is generally of circular symmetry about a longitudinal axis and comprises a tubular casing 7 surrounding a coaxial tubular porous member 8. The ends of the casing 7 are closed by respective end plates 9 and 10 forming an enclosure which also support the ends of the tubular member 8. A coaxial cylindrical core 11 is mounted on a shaft 12 and is rotatable in end bearings fitted in the end plates 9 and 10. The volume between the core 11, the inside surface of the tubular member 8 and the end plates 9 and 10 constitutes a filter chamber. The pipe 5 passes through the end plate 9 to constitute the liquid inlet into the filter chamber.

One end of the shaft 12 has a pulley 13 which is coupled via a belt 14 to a pulley 15 which is mounted on the shaft of an electric drive motor 16.

The porous tube 8 is made of a rigid sintered material, based on a ceramic powder or on a metallic powder. Each pore in this material communicates with the adjacent pores. The tube 8 comprises a peripheral tubular portion having pores of much larger size than the particles contained in the liquid to be filtered. This peripheral portion constitutes a mechanical support for an inside tubular portion which constitutes a thin filter membrane, the pores in the membrane being of smaller size than the particles to be filtered. Naturally the inside and peripheral portions of the tube 8 are coaxial and interconnected.

The end plate 10 has an opening which constitutes the outlet from filter chamber. This outlet is connected via pipes such as 17 and a positive displacement pump 19 to a tank 18.

A filter 20, identical with the filter 6, comprises an enclosure having a filter chamber whose inlet is connected via a pipe 21 to opening 22 in the casing 7 of the filter 6. The filter 20 includes a porous tube 23, a casing 24 and a cylindrical core 25 identical to the corresponding items of the filter 6. Its filter chamber is also identical except that it has no outlet. The core 25 is rotated by a drive motor 26.

The casing 24 of the filter 20 includes an opening 27 which is connected by pipes to a tank 32 via a controllable backpressure unit 30 and apparatus 31 for measuring flow rate connected in series. A valve 29 is disposed on the wall of the pipe 28 connecting the unit 30 to the measuring apparatus 31.

The apparatus 31 is electrically connected to the motor of the pump 19 via a servo control circuit 33.

The backpressure unit 30 is electrically connected via a control circuit 35 to the output from a processor circuit 34.

The processor circuit 34 has four inputs 36, 37, 38 and 39. The input 36 is connected to a manometer 40 which is connected to the pipe 5. The input 37 is connected to a manometer 41 which is connected to the pipe 21. The input 38 receives a signal concerning the operating pressure of the valve 29. The input 39 receives a signal concerning the backpressure from the unit 30.

The system described above with reference to FIG. 1 operates as follows:

The pressure of the liquid to be filtered at the inlet to the filter 6 and as read by the manometer 40, is maintained at a constant value $P_1$ by acting on the escape valve 3. The motor 16 is then started so as to cause the liquid contained in the filter chamber to flow parallel to the inside surface of the tube 8 and perpendicularly to the axis of the core. The core 11 may optionally includes fins (not shown) to help cause the liquid to rotate.

Filters can be made in which the core is stationary or in which there is no core. In such cases the liquid contained in the filter chamber is made to move tangentially relative to the inside surface of the tube 8 by means of an auxiliary pump having its inlet connected in parallel with the pipe 17 and its outlet connected in parallel with the pipe 5, thereby setting up tangential flow which run parallel to the axis of the filter.

Naturally, the porous filter member is not necessarily a tube. In particular it could be constituted by a plurality of plane plates with the liquid to be filtered being made to flow parallel to the plate or plates.

A portion of the liquid moving inside the filter chamber passes through the pores in the tube 8, with the particles being retained at the inside surface of the tube membrane. Once the filtrate has passed through the tube 8 it flows into the enclosure between the tube 8 and the casing 7, and then it flows via the opening 22 into the pipe 21 towards the inlet to the filter 20. The liquid contained in the filter chamber of the filter 20 is made to flow at the same tangential speed as in the filter 6, with the drive motor 26 turning at the same speed as the motor 16.

When the liquid has passed through the porous tube 23 of the filter 20 and through the enclosure between the tube 23 and the casing 24, it runs out via the opening 27 to the backpressure unit 30.

The valve 29 disposed in the wall of the pipe 28 serves to limit the pressure of the liquid flowing through this pipe to an adjustable maximum value. Because of the rotating cores 11 and 25 in the filters 6 and 20, the liquid to be filtered which generally contains gas in solution runs the risk of releasing bubbles of gas. These bubbles are then liable to lodge in the pores of the membrane thereby blocking them and also attenuating the effect of the backpressure used for backwashing.

In practice the valve operates as soon as the motors 16 and 26 are started; it is adjusted to a pressure $P_4$ which is less than $P_1$ in such a manner as to prevent bubble formation.

When the liquid to be filtered contains very little gas, the valve 29 may be omitted. The pipe 28 would then be fitted with a free air container connected in parallel. The pressure of the liquid in the pipe 28 is then stabilized to atmospheric pressure.

The backpressure unit 30 essentially comprises a cylinder having a piston slidably mounted therein together with means for controlling the stroke of the piston each time the unit 30 receives a control signal from the circuit 35 so as to thrust the filtrate back towards the filter in the opposite direction to normal flow. The unit 30 thus sets up a backpressure $P_2$ which is large in comparison with $P_1$. The backpressure is transmitted via the filter 20 (whose membrane does not become clogged since it always has particle-free liquid passing through it) towards the filter 6 in such a manner as to exert a backpressure which is greater than or equal to $P_2/2$ on the inside surface of the porous tube 8 of the filter 6. This backpressure serves to dislodge from the inside surface of the porous tube 8 those solid particles which are blocking the pores of the tube membrane. When the membrane of the tube 8 is not clogged, the backpressure exerted on the tube is equal to $P_2/2$. The backpressure $P_2$ created by the stroke of the piston in the unit 30 is adjusted to a constant value which is advantageously chosen to be as high as possible, given the mechanical strength of the filter tube. The backpressure is exerted for a predetermined period of time, e.g. about half a second, each time the unit 30 is put into operation.

During normal operation of the system, the unit 30 is not switched on and the liquid leaving the filter 20 through the opening 27 flows via the unit 30 and the measuring apparatus 31 to the tank 32, without being hindered by the unit 30. The servo control system 33 receives a filtrate flow rate signal from the apparatus 31 and sets the pumping rate of the positive displacement pump 19 in such a manner as to keep a constant predetermined ratio between the filtrate flow rate and the flow rate of the liquid retained in the filter chamber of the filter 6 by the membrane of the tube 8. In general, this constant ratio is fixed from the beginning as a function of the degree of concentration desired for the liquid to be filtered.

The processor circuit 34 receives signals conveying the following information:
pressure $P_1$ from the manometer 40;
backpressure $P_2$ to which the backpressure unit 30 is set;
pressure $P_3$ of the liquid flowing in the pipe 21 from the the manometer 41; and
pressure $P_4$ to which the valve 29 is set.

On the basis of this information, the processor circuit 34 continuously determines the value of the expression A as defined by the following equation:

$$A = (P_1 - P_3) - (P_3 - P_4)$$

i.e. $A = P_1 - 2P_3 + P_4$

The processor circuit 34 also determines the value of the expression B as defined by the following equation:

$$B = (K/2N)(P_2 - P_1) - (P_1 - P_4)$$

i.e. $B = (K/2N)(P_2 - 2P_1 + P_4)$

B remains constant so long as $P_1$, $P_2$ and $P_4$ are regulated.

K is a safety factor of value slightly less than unity, for example a good starting value might be K=0.9 or 0.95.

N is the number of layers of grains in the thickness of the membrane of the porous filter tube. The membrane has a granular structure since it is made from a sintered powder of a material such as a ceramic or a metal. If the number N is not given directly by the manufacturer of the porous tube, it may be determined by examining a section of the membrane at an enlarged scale. A microscope slide of such a section will show a succession of juxtaposed grains. From such a slide, it is easy to determine the average number of grains per unit length along arbitrary lines across the slide. Given the thickness of the membrane (perhaps from the same slide), the number of grains N across its thickness is then readily determined.

At the beginning of a filtering operation, the porous tube 8 is free from particles. In practice the value of A is less than the value of B.

As the filtering operation proceeds, the particles in the liquid clog the inside surface of the tube 8, causing the pressure $P_3$ to fall progressively. This results in an increase in the algebraic value of the expression A, while the value of B remains constant for regulated $P_1$, $P_2$ and $P_4$.

The Applicant has discovered that at the moment when A is equal to B/K the membrane 8 is clogged to a critical degree. If filtering continues without the backpressure unit 30 being operated, the membrane becomes so clogged that the clogging cannot be removed by operating the backpressure unit.

When A=B (i.e. shortly before A=B/K) the circuit 35 delivers a control signal which triggers the backpressure unit 30. As a result, as explained above, the membrane of the tube 8 is unclogged. The system is returned substantially to its starting conditions.

Each time A=B, the backpressure unit 30 is activated, thereby avoiding irreversible clogging of the membrane. There is thus no need to interrupt filter operation to disassemble the porous tube from the filter 6 in order to regenerate its membrane, e.g. in a high temperature oven.

The operation of filtering a given liquid thus comprises a plurality of successive cycles during which the average filter rate remains substantially constant, said average filter rate lying between a maximum rate at the beginning of each cycle and a minimum at the end of each cycle.

Further, the total time required to filter a given liquid is less than that required to filter the liquid using a prior art filter. By using a system in accordance with the invention, backwashing operations are less frequent than before since they are triggered only when the filter membrane has reached a maximum degree of clogging that can be effectively washed clean by applying backpressure.

The system shown in FIG. 1 can be used to control the operation of a plurality of filter installations of the type shown in FIG. 2, in which each FIG. 2 type installation can run at a higher flow rate than the FIG. 1 installation.

In FIG. 2, a tank 51 contains a liquid to be filtered 52 which is identical to the liquid 2 in FIG. 1. The volume of the tank above the equilibrium surface of the liquid 52 is in communication with a release valve 53 connected to the outlet from a cylinder of compressed gas 54. A pipe 55 connects the bottom of the tank 51 to the inside volume of a filter 56. The filter 56 is analogous to the filter 6 in FIG. 1. In particular, it comprises a filter tube 58 of whose cross section is identical in shape and structure to the cross section of the tube 8. However, as shown, the tube 58 is advantageously longer than the tube 8, thereby increasing its filter area. Similarly, the filter 56 contains an axial core 59 which has the same cross section as the core 11, but which is longer. The core 59 is rotated by a drive motor 60.

The filter 56 has an outer casing 57 fitted with an opening 61 connected by pipes via a backpressure unit 63 and a flow rate measuring apparatus 64 connected in series to a tank 62. The pipe 65 connecting the unit 63 to the measuring apparatus 64 is fitted with a valve 66 analogous to the valve 29.

The filter chamber of the filter 56 includes an outlet connected by pipes via a positive displacement pump 68 to a tank 67.

Flow rate information measured by the apparatus 64 is transmitted over an electrical connection to a servo system 69 whose output controls the electric motor driving the pump 68.

The backpressure unit 63 is electrically connected to the output from a control circuit 70. The output from a clock 71 is connected to the input to a memory 72 whose output is connected to the input of the circuit 70.

The input to the clock 71 is connected by an electrical connection 73 to an output from the control circuit 35 (FIG. 1).

The system described above and shown in FIGS. 1 and 2 operates as follows:

Before the installation is started, the equipment shown in FIG. 1 is set up as follows: the inlet pressure of the liquid in the filter chamber of the filter 6 is set to the value $P_1$, the backpressure unit 30 is set to exert a back pressure $P_2$, and the valve 29 is set to a pressure $P_4$. The servo system 33 is set to keep a constant ratio "C" between the filtrate flow rate measured by the apparatus 31 and the flow rate of the pump 19.

The equipment shown in FIG. 2 is then set up as follows: the motor 60 must turn at the same rate as the motors 16 and 26 so as to drive the liquid contained in the filter chamber at the same speed.

The inlet pressure of the liquid in the filter 56 is set to a value $Q_1$ such that $Q_1=(P_1+P_4)/2$, the backpressure unit is set to exert a backpressure $Q_2$ such that $Q_2=(P_2+P_4)/2$, and the valve 66 is set to a pressure $Q_4=P_4$.

Further, the servo control system 69 is set to maintain the same constant ratio C between the filtrate flow rate as measured by the apparatus 64 and the flow rate through the pump 68.

Naturally, the equipment shown in FIGS. 1 and 2 are located close to each other so that they operate at substantially the same ambient temperature.

The FIG. 1 equipment is started first as explained above. The instant it starts, the clock 71 is also started. This may be done manually or it may be under automatic control by means (not shown) responsive to the motors 16 and 26 being switched on.

When the backpressure unit 30 is operated for the first time, the clock 71 receives a signal from the control circuit 35 and delivers a signal representative of the time $\Delta t_1$ that has elapsed since filtering started.

Likewise, when the unit 30 is operated for a second time, and for each subsequent time, the clock 71 delivers signals representative of the time which elapses between successive operations of the backpressure unit 30, i.e. $\Delta t_2, \Delta t_3, \ldots \Delta t_n$.

The time intervals $\Delta t_1$ to $\Delta t_n$ are stored in the memory 72.

The existance of the memory 72 makes it possible to start the FIG. 2 equipment after the FIG. 1 equipment has been started. The circuit 72 includes means for delivering backwash control signals for the unit 63 at the stored time intervals counting from the instant the FIG. 2 equipment is, in fact, started. These signals are transmitted to the control circuit 70 which then sets the unit 63 in operation for a period of time equal to that used for the unit 30.

It can thus be seen that the equipment shown in FIG. 1 is used as a "pilot" equipment whose main function is to determine the successive backwash time intervals $\Delta t_1, \Delta t_2, \ldots, \Delta t_n$ appropriate to a particular filtering operation, which time intervals are then used to control backwashing in one or more "production" equipments of the type shown in FIG. 2.

Filter systems in accordance with the present invention can be used for filtering organic liquids such as milk, wine, or beer. They can also be used for filtering waste water so that it can be sterilized to produce drinking water.

I claim:

1. A system for filtering particles from a liquid, the system comprising:
    (a) a first filter comprising:
    an enclosure, a filter chamber within said enclosure partially defined by a wall and having an inlet,
    a portion of the wall of said chamber being constituted by a porous member of sintered material having an inside surface facing the inside volume of the chamber and an outside surface facing the other way, the inside and outside surfaces being parallel to each other, the porous member including a membrane one of whose surfaces constitutes said inside surface, the pores in the membrane being smaller than the particles to be filtered from said liquid, each pore being in communication with adjacent pores, and
    said enclosure surrounding said outside surface, said enclosure being provided with an outlet opening;
    (b) means for inserting the liquid into the chamber via its inlet and at a first constant pressure $P_1$;
    (c) means for impressing a predetermined speed parallel to said inside surface to the liquid contained inside the chamber, a portion of the liquid passing through the porous member and being received in the enclosure;
    (d) a pump connected to the outlet opening of said enclosure and to a first tank for removing another portion of the liquid that has circulated inside the chamber;
    (e) liquid flow rate measuring apparatus series connected between the outlet opening from the enclosure and a second tank;
    (f) a servo-control circuit receiving information concerning the measured flow rate and capable of controlling the pump to maintain a constant predetermined ratio between the measured flow rate and the pump flow rate; and
    (g) a controllable liquid back pressure unit connected between the outlet opening of the enclosure and the measuring apparatus for applying, during a predetermined period of time, a second constant liquid pressure $P_2$ on the outside surface of the porous member, in opposition to the first constant pressure $P_1$, where $P_2$ is greater than $P_1$,
    the improvement wherein the system further includes:
    (h) a second filter identical to the first filter including an enclosure, a second filter chamber, an inlet to the second filter connected to the outlet opening from the enclosure of an first filter by a first pipe, the outlet from the second filter being closed, the second filter having an outlet opening from the second filter enclosure connected to the flow rate measuring apparatus via the backpressure unit;
    (i) means for impressing said predetermined speed parallel to the inside surface of the porous member of the second chamber to the liquid contained therein;
    (j) a manometer for measuring the pressure $P_3$ of the liquid flowing in said first pipe;
    (k) means for maintaining the pressure $P_4$ of the liquid flowing in a second pipe constant when the backpressure unit is not operating, said second pipe connecting the outlet of the backpressure unit to the inlet of the flow rate measuring apparatus;
    (l) a processor circuit receiving signals representative of the pressure $P_1$, $P_2$, $P_3$, and $P_4$, said circuit including means capable of determining firstly the value:

$$A = P_1 - 2P_3 + P_4$$

and secondly the value:

$$B = (K/2N)(P_2 - 2P_1 + P_4),$$

where K is a predetermined safety factor less than unity, and N is a predetermined coefficient depending on the membranes of the porous members; and
(m) a control circuit connected to the processor circuit and to the backpressure unit, said control circuit including means capable of delivering a control signal when the values A and B as determined by the processor circuit are equal to each other, such that said control signal causes said backpressure unit to operate.

2. A system according to claim 1, further including:
(n) a clock connected to the control circuit for measuring the time interval $\Delta t_1$ from the beginning of filtering to the first instant at which the backpressure unit is operated, and likewise for measuring the time intervals $\Delta t_2$, $\Delta t_3$, etc;
t separating successive instants at which the backpressure unit is operated;
(o) a memory connected to the clock to store data indicative of said succesive time intervals; and
(p) at least one filter equipment comprising:
an enclosure,
a third filter analogous to the first filter including a filter chamber, an outlet opening within said chamber for said enclosure, and having a filter area which is equal to or greater than the filter area of the first filter;
means for inserting the liquid to be filtered into the filter chamber of the third filter at a constant pressure $Q_1$;
means for impressing on said liquid contained in the chamber of the third filter a speed identical to the speed impressed on the liquid in the filter chamber of the first filter;
an additional pump connected to the outlet opening from the enclosure of the third filter and to a third tank for extracting a portion of the liquid that has circulated in the chamber of the third filter;
an additional liquid flow rate measuring apparatus connected between the outlet opening from the enclosure of the third filter and a fourth tank;
an additional servo control circuit receiving a flow-rate signal from the additional measuring apparatus and capable of controlling the additional pump to maintain said constant predetermined ratio between the measured flow rate and the pump flow rate;
an additional controllable backpressure unit connected between the outlet opening from the enclosure of the third filter and the additional flow rate measuring apparatus, and capable of exerting during said predetermined period of time a constant liquid pressure $Q_2$ on the outside surface of the porous member of the third filter in opposition to the pressure $Q_1$;
means for maintaining a constant liquid pressure $Q_4$ in a third pipe while said additional backpressure unit is not operating, said third pipe connecting the outlet from said additional backpressure unit to the inlet to said additional flow rate measuring apparatus, the values $Q_1, Q_2$, and $Q_4$ being defined by the following relationships:

$$Q_1 = (P_1 + P_4)/2$$

$$Q_2 = (P_2 + P_4)/2$$

and an additional control circuit connected to said memory to control operation of the additional backpressure unit at said time intervals $\Delta t_1, \Delta t_2, \ldots \Delta t_n$, and beginning from the start of operation of said third filter.

3. A system according to claim 2, wherein said porous member is a ceramic tube, and said membrane is tubular, said porous member comprising a tubular support disposed coaxially around the membrane and integral therewith, and the pores of the support being larger than the size of the particles.

4. A system according to claim 2, wherein said means for impressing a predetermined speed parallel to said inside surface of the membrane to the liquid contained in the filter chamber comprise, for each filter, an additional pump having its inlet and its outlet connected respectively to the outlet and the inlet of the filter.

5. A system according to claim 2, wherein said means for impressing a predetermined speed parallel to said inside surface of the membrane to the liquid contained in the filter chamber comprise, for each filter, a rotary cylindrical core mounted coaxially inside the filter chamber and means for rotating said core at a predetermined speed.

6. A system according to claim 1, wherein said porous member is a ceramic tube, and said membrane is tubular, said porous member comprising a tubular support disposed coaxially around the membrane and integral therewith, and the pores of the support being larger than the size of the particles.

7. A system according to claim 1, wherein said means for impressing a predetermined speed parallel to said inside surface of the membrane to the liquid contained in the filter chamber comprise, for each filter, an additional pump having its inlet and its outlet connected respectively to the outlet and the inlet of the filter.

8. A system according to claim 1, wherein said means for impressing a predetermined speed parallel to said inside surface of the membrane to the liquid contained in the filter chamber comprise, for each filter, a rotary cylindrical core mounted coaxially inside the filter chamber and means for rotating said core at a predetermined speed.

* * * * *